United States Patent
Henry et al.

[15] 3,683,090
[45] Aug. 8, 1972

[54] METHODS OF REPELLING RODENTS USING TETRAVALENT ORGANO-LEAD COMPOUNDS

[72] Inventors: Malcolm C. Henry, Old Littleton Road, Harvard, Mass.; Adolf W. Krebs, 24 Albert-Ueberlestrasse, Heidelberg, Germany

[22] Filed: June 15, 1970

[21] Appl. No.: 46,534

Related U.S. Application Data

[60] Continuation-in-part of Ser. No. 634,111, April 27, 1967, abandoned, which is a division of Ser. No. 269,771, April 1, 1963, Pat. No. 3,322,779.

[52] U.S. Cl. ................................... 424/293, 424/30
[51] Int. Cl. .............................................. A01n 9/00
[58] Field of Search ......... 424/293, 30; 260/436, 437

[56] References Cited

UNITED STATES PATENTS

| | | |
|---|---|---|
| 2,044,934 | 6/1936 | Calcott et al. ............. 424/168 |
| 2,789,104 | 4/1957 | Ramsden et al. ........ 260/45.75 |
| 3,073,853 | 1/1963 | Ballinger .................... 260/437 |
| 3,081,325 | 3/1963 | Ballinger .................... 260/437 |
| 3,073,854 | 1/1963 | Ballinger .................... 260/437 |
| 3,142,614 | 7/1964 | Ligett ......................... 424/293 |
| 2,900,303 | 2/1957 | McWilliams ............... 424/294 |
| 3,322,779 | 5/1967 | Henry et al. ............... 260/436 |

OTHER PUBLICATIONS

Leeper et al., Chemical Reviews, Vol. 54, No. 1 (1954), pp. 136–151.
Henry, Inorganic Chemistry, Vol. 1, No. 4 (1962) pp. 917–921.
Bellack et al., " Relationship Between Chemical Structure & Rat Repellancy," National Research Council (1953) pp. 48–55, 81, 85, 122, 125–129, 144–145.
J. Chem. Soc. (C) 1968, pp. 317–322.

*Primary Examiner*—Albert T. Meyers
*Assistant Examiner*—Leonard Henkman
*Attorney*—Brumbaugh, Graves, Donohue & Raymond

[57] ABSTRACT

Rodents can be effectively repelled from materials subject to rodent attack by treating the materials with certain organo-lead compounds wherein the lead is generally in the tetravalent state.

19 Claims, No Drawings

METHODS OF REPELLING RODENTS USING TETRAVALENT ORGANO-LEAD COMPOUNDS

This application is a continuation-in-part of our co-pending U.S. application, Ser. No. 634,111, filed Apr. 27, 1967, now abandoned, which in turn is a divisional application of our U.S. application Ser. No. 269,771, filed Apr. 1, 1963, now U.S. Pat. No. 3,322,779, granted May 30, 1967, the disclosures of which are incorporated by reference herein.

The present invention relates to a method of repelling rodents from materials subject to rodent attack.

Rodents, such as rats and mice, cause extensive damage yearly to man's food supply, such as seeds and packaged foodstuffs. In addition, they cause widespread and costly damage by attacking the insulation on buried or other electrical cable.

Therefore, in accordance with the present invention, there is provided a highly effective method of repelling rodents from materials subject to rodent attack by treating such materials with certain organo-lead compounds in an amount sufficient to repel rodents. The organo-lead compounds used in the process of the invention are known compounds. However, it has been found that these particular organo-lead compounds, as opposed to organo-lead compounds in general, have the unexpected property of being excellent rodent repellents.

The organo-lead compounds employed in the process of the invention are as follows: thiobenzoyl triphenyllead, dithiobenzyl diphenyllead, thiopropyl triphenyllead, thioacetyl triphenyllead, thiomethyl-triphenyllead, thiophenyltriphenyllead, lead benzyl-mercaptide, triphenyllead chloride, triphenylmethyl-lead, diphenyllead-bis(meta-nitrophenylarsonate), diphenyllead-bis(allyl-arsonate), diphenyllead-bis(benzylarsonate), bis(triphenyl-lead) acetylene dicarboxylate, diphenyllead dichloride, bis-triphenyl-lead sulfide and diphenyllead-bis(methyl-arsonate).

Materials which are subject to rodent attack are exemplified by seeds, seedlings, insulated electrical cable and packaging for foods, e.g., paper, plastic, burlap and textile packaging materials. Such materials, in accordance with the present invention, are treated, i.e., coated, dusted, impregnated, etc., with the above mentioned organo-lead compounds. The organo-lead compounds can be applied to the materials as powdered compounds per se or in a carrier, e.g., as solutions or suspensions thereof in a suitable inert or compatible solvent or suspension medium therefor. Typical solvents for forming solutions of the organo-lead compounds include benzene, n-hexane, ethyl alcohol, chloroform, and most of the other common organic solvents. Water is a typical dispersion medium for forming suspensions of the organo-lead compounds. The solution or suspension, where desired, can contain a suitable adhesive or film-forming binder, such as a resin, to assist in the adherence of the organo-lead compound to the material treated therewith.

The concentration of the organo-lead compound in a carrier system can vary widely and is not critical. Obviously, less of a concentrated treating solution or suspension need be employed than for a dilute system in order to apply the same amount of organo-lead compound to the material to be treated for rodent repellency.

Cables, for example, can be coated with a rubber-resin-organo-lead compound matrix. Burlap and other packaging material can be treated with a solution of the organo-lead compound and then squeezed dry. Seedlings can be treated, for example, with a resin suspension consisting of a 10 percent by weight of solids emulsion of "Rhoplex AC-33" used as a vehicle for the organo-lead compound rodent repellent at a 6 percent weight/volume concentration. The seedlings can be simply dipped in the formulation and transplanted. Seed can be typically treated by mixing them with the powdered organo-lead compound or by forming a slurry of them with a solution or suspension of the organo-lead compound and then evaporating the solvent or suspension medium.

The amount of the organo-lead compound to be applied to or deposited on the material to be treated will vary primarily with the activity of the organo-lead compound as a rodent repellent and with the nature of the material to be treated. Accordingly, the materials subject to rodent attack are treated with the organo-lead compound in an amount sufficient to repel rodents. Excessive amounts of the rodent repellent would not normally be used, because they would only be wasteful in adding to the cost of treatment without giving a commensurate return in efficacy. As a typical example of such a sufficient amount, seeds can be treated with the rodent repellent so as to deposit thereon 1 percent by weight of the organo-lead compound based on the weight of the seeds. Other suitable amounts for deposition on materials subject to rodent attack can be readily ascertained by mere routine experimentation.

The process of the present invention will be illustrated further by the following examples thereof:

EXAMPLES 1–22

Twenty-five white wheat seeds were treated as described above with the respective organo-lead compounds set forth in Table I below so as to deposit on the seeds 1 percent by weight of each of the organo-lead compounds based on the weight of the seeds. The treated seeds were offered to each of 10 house mice for an overnight period of from 16 to 18 hours. If 13 or more seeds were uneaten, the animal was considered to be repelled. The results of these individual comparative tests are given in the following Table I:

TABLE I

| Ex. No. | Formula of Organo-lead Compound | Name of Organo-lead Compound | Repellency to House Mice — No. Repelled/ No. Tested |
|---|---|---|---|
| 1 | $(C_6H_5)_3PbSCOC_6H_5$ | Thiobenzoyl triphenyllead | 10/10 |
| 2 | $Ph_2Pb(SCH_2C_6H_5)_2$ | Dithiobenzyl diphenyllead | 10/10 |
| 3 | $Ph_3PbSC_3H_7$ | Thiopropyl triphenyllead | 10/10 |
| 4 | $Ph_3PbSCOCH_3$ | Thioacetyl triphenyllead | 8/10 |
| 5 | $(C_6H_5)_3PbSCH_3$ | Thiomethyl-triphenyllead | 10/10 |
| 6 | $(C_6H_5)_3PbSC_6H_5$ | Thiophenyl-triphenyllead | 10/10 |
| 7 | $Pb(SCH_2C_6H_5)_2$ | Lead benzyl-mercaptide | 10/10 |
| 8 | $(C_6H_5)_3PbCl$ | Triphenyllead | |

| | | | |
|---|---|---|---|
| 9 | $(C_6H_5)_3PbCH_3$ | Triphenylmethyllead | 10/10 |
| 10 | $(C_6H_5)_2PbR_2$ where $R = -OAs(O)OC_6H_4NO_2-m$ | Diphenyllead-bis(m-nitrophenylarsonate) | 10/10 |
| 11 | $(C_6H_5)_2PbR_2$ where $R = -OAs(O)OCH_2CH=CH_2$ | Diphenyllead-bis(allylarsonate) | 10/10 |
| 12 | $(C_6H_5)_2PbR_2$ where $R = -OAs(O)OCH_2C_6H_5$ | Diphenyllead-bis(benzylarsonate) | 10/10 |
| 13 | $[(C_6H_5)_3PbO(O)CC \equiv CC(O)O[Pb(C_6H_5)_3]$ | Bis(triphenyllead)acetylene dicarboxylate | 10/10 |
| 14 | $(C_6H_5)_2PbCl_2$ | Diphenyllead dichloride | 10/10 |
| 15 | $[(C_6H_5)_3Pb]_2S$ | Bis-triphenyllead sulfide | 7/10 |
| 16 | $(C_6H_5)_2Pb[OAs(O)OCH_3]2$ | Diphenyllead-bis(methylarsonate) | 7/10 |
| 17 | $Pb(SCH_3)_2$ | Lead methylmercaptide | 8/10 |
| 18 | $Pb(SC_3H_7)_2$ | Lead propylmercaptide | 2/10 |
| 19 | $Pb(SC_6H_5)_2$ | Lead phenylmercaptide | 2/10 |
| 20 | $Pb(SC_2H_5)_2$ | Lead ethylmercaptide | 1/10 |
| 21 | $Pb(SC_4H_9)_2$ | Lead-n-butylmercaptide | 0/10 |
| 22 | $Ph_4Pb$ | Tetraphenyllead | 0/10 |

From the comparative data set forth in Table I above it will be readily apparent that the organo-lead compounds of Examples 1–16 of the invention have excellent and unusually high rodent repellent properties in that they repelled at least 7 out of 10 mice and usually repelled all 10 out of 10 mice used in the test. In contradistinction thereto, other comparative organo-lead compounds not utilized in the process of the invention, namely, the organo-lead compounds of comparative Examples 17–22, were either totally ineffective as rodent repellents or exhibited so little rodent repellency as to be insignificant.

It will be noted that of the sixteen rodent repellent organo-lead compounds of Examples 1–16, fifteen are compounds wherein lead is in the tetravalent state while only in the compound of Example 7 lead is in the divalent state. On the other hand, in the comparative organo-lead compounds of the six Examples 17–22 lead was in the divalent state in five of them and was in the tetravalent state in only Example 22. Therefore, as a possible general rule it would appear that tetravalent organo-lead compounds are highly effective rodent repellents while divalent organo-lead compounds are not, although this potential general principle is not without exceptions thereto.

It will be appreciated that various modifications and changes can be made in the process of the invention by those skilled in the art in addition to those disclosed above without departing from the essence of the invention and that accordingly the invention is to be limited only within the scope of the appended claims.

What is claimed is:

1. A method of repelling rodents from a material subject to rodent attack which comprises treating said material with an organo-lead compound selected from the group consisting of thiobenzoyl triphenyllead, dithiobenzyl diphenyllead, thiopropyl triphenyllead, thioacetyl triphenyllead, thiomethyl-triphenyllead, thiophenyltriphenyllead, lead benzyl-mercaptide, triphenyllead chloride, triphenylmethyllead, diphenyllead-bis(meta-nitrophenylarsonate), diphenyllead-bis(allylarsonate), diphenyllead-bis(benzylarsonate), bis(triphenyllead) acetylene dicarboxylate, diphenyllead dichloride, bis-triphenyllead sulfide and diphenyllead-bis(methylarsonate) in an amount sufficient to repel rodents.

2. The method as defined by claim 1 wherein the organo-lead compound is thiobenzoyl triphenyllead.

3. The method as defined by claim 1 wherein the organo-lead compound is dithiobenzyl diphenyllead.

4. The method as defined by claim 1 wherein the organo-lead compound is thiopropyl triphenyllead.

5. The method as defined by claim 1 wherein the organo-lead compound is thioacetyl triphenyllead.

6. The method as defined by claim 1 wherein the organo-lead compound is thiomethyltriphenyllead.

7. The method as defined by claim 1 wherein the organo-lead compound is thiophenyltriphenyllead.

8. The method as defined by claim 1 wherein the organo-lead compound is lead benzylmercaptide.

9. The method as defined by claim 1 wherein the organo-lead compound is triphenyllead chloride.

10. The method as defined by claim 1 wherein the organo-lead compound is triphenylmethyllead.

11. The method as defined by claim 1 wherein the organo-lead compound is diphenyllead-bis(meta-nitrophenylarsonate).

12. The method as defined by claim 1 wherein the organo-lead compound is diphenyllead-bis(allyl-arsonate).

13. The method as defined by claim 1 wherein the organo-lead compound is diphenyllead-bis(benzyl-arsonate).

14. The method as defined by claim 1 wherein the organo-lead compound is bis(triphenyllead)acetylene dicarboxylate.

15. The method as defined by claim 1 wherein the organo-lead compound is diphenyllead dichloride.

16. The method as defined by claim 1 wherein the organo-lead compound is bis-triphenyllead sulfide.

17. The method as defined by claim 1 wherein the organo-lead compound is diphenyllead-bis(methyl-arsonate).

18. The method as defined by claim 1 wherein the organo-lead compound is deposited on said material by dusting the material with the organo-lead compound in powder form.

19. The method as defined by claim 1 wherein the organo-lead compound is deposited on said material from a solution or suspension thereof.

* * * * *